United States Patent [19]
Tracy

[11] 3,753,575
[45] Aug. 21, 1973

[54] FLUID COUPLING ASSEMBLY

[75] Inventor: Gene Arthur Tracy, Hugo, Minn.

[73] Assignee: The Cornelius Company, Anoka, Minn.

[22] Filed: Oct. 20, 1971

[21] Appl. No.: 190,931

[52] U.S. Cl............ 285/137 R, 285/28, 285/367, 285/423
[58] Field of Search................ F16l/39/00; 285/137 R, 242, 423, 365, 366, 367, 407, 408, 409, 410, 411, 24–29

[56] References Cited
UNITED STATES PATENTS

| | | | |
|---|---|---|---|
| 2,785,911 | 3/1957 | Kaufman | 285/137 R X |
| 3,630,552 | 12/1971 | Byron | 285/367 |
| 3,590,855 | 6/1971 | Woolen | 285/137 R |
| 2,937,893 | 5/1960 | Hill et al. | 285/410 X |
| 3,503,634 | 3/1970 | Cadiou | 285/137 R |
| 2,438,679 | 3/1948 | Parker | 285/137 R |
| 2,701,147 | 2/1955 | Summerville | 285/11 |
| 3,305,249 | 2/1967 | Zahuranei | 285/137 R X |

Primary Examiner—Dave W. Arola
Attorney—Carlton Hill, J. Arthur Gross et al.

[57] ABSTRACT

A fluid-coupling assembly includes a pair of rigid housings clamped together including parallel bores therethrough into which flexible hoses project. A rigid barbed ferrule is disposed within the inner end of each of the hoses, and all of the ferrules have a fluid seal with one of the housings.

6 Claims, 4 Drawing Figures

FLUID COUPLING ASSEMBLY

BACKGROUND

This invention pertains to a fluid-coupling assembly, especially for use with multiple low pressure lines.

Prior Art

It has been known heretofore to provide fluid-couplings including those which can accommodate more than one fluid line. In the beverage dispensing industry, it is frequently necessary that the fluid couplings be attached to the hoses in the field by service men or installers, and in prior devices, the method of disconnecting and the method of connecting a particular line to the coupling has been relatively burdensome.

SUMMARY OF THE INVENTION

The present invention is directed to a fluid-coupling assembly wherein a barbed ferrule is forced into a flexible hose, and the portion of the hose that receives the barbed ferrule is surrounded by a portion of a rigid housing, two such housings being releasably clamped together, and the assembly preferably including a symmetrical arrangement of a plurality of such lines.

Accordingly, it is an object of the present invention to provide an improved fluid-coupling assembly.

A further object of the present invention is to provide a coupling assembly that can be secured to a hose using only a mallet.

A further object of the present invention is to provide a coupling assembly wherein the hose can be secured thereto using only a mallet and a plug.

A still further object of the present invention is to provide a coupling assembly wherein the hose can be disconnected from the assembly housing by means of only a knife, a plug, and a mallet.

Yet another object of the present invention is to provide a fluid-coupling assembly having housings that can be disconnected one from the other by use of a screw driver as the only tool for such purpose.

A still further object of the present invention is to provide a coupling assembly which comprises a pair of molded housings, means for holding the housings together, only one type of hose, only one type of barbed ferrule, and only one type of fluid seal, even though such coupling assembly accommodates a plurality of fluid lines.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWING

AS SHOWN ON THE DRAWINGS

Figure 1:
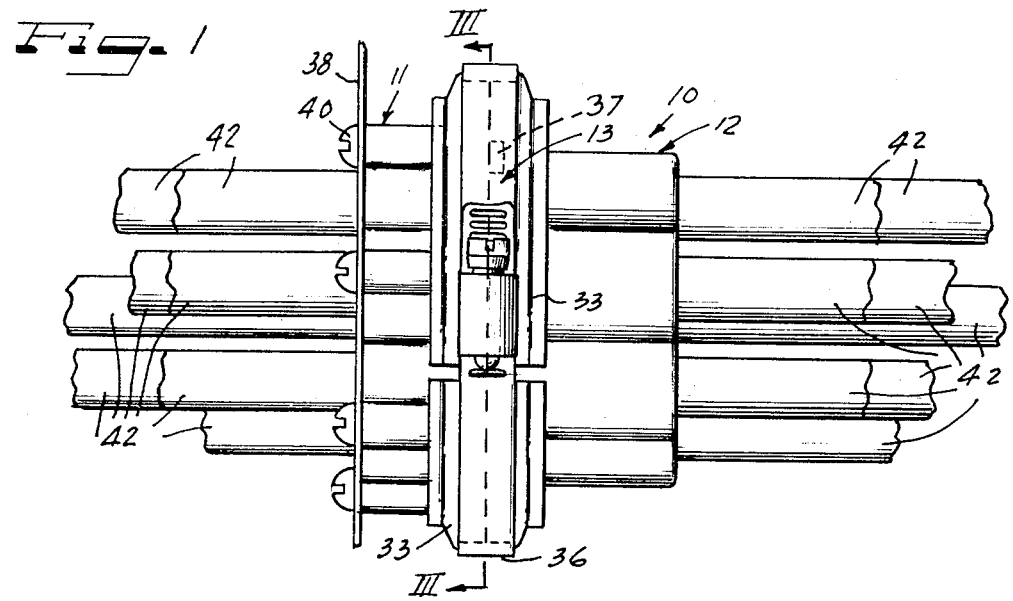
FIG. 1 is a side elevational view of a fluid-coupling assembly provided in accordance with the principles of the present invention.
Figure 2:
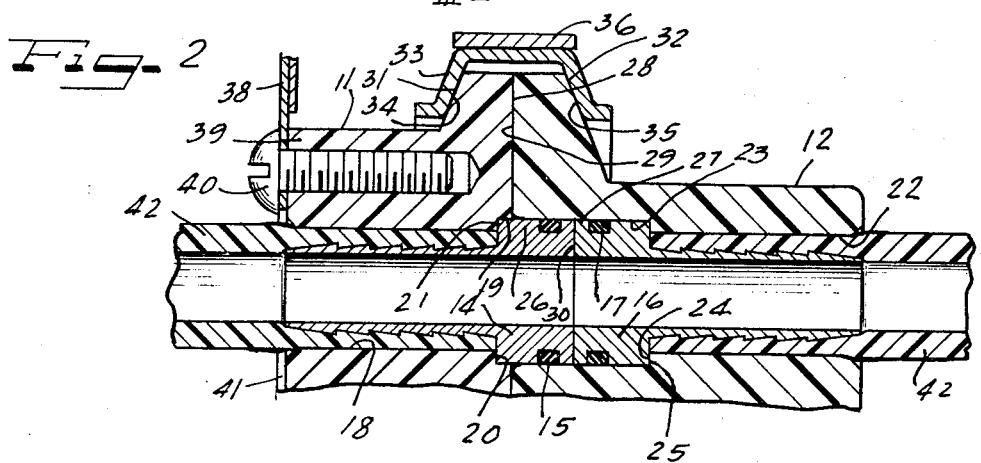
FIG. 2 is an enlarged cross-sectional view taken through one of the fluid lines of FIG. 1.

The principles of the present invention are particularly useful when embodied in a fluid-coupling assembly such as illustrated in FIG. 1, generally indicated by the numeral 10. The fluid-coupling assembly includes a rigid housing 11, a rigid housing 12, holding means 13 for detachably holding the housings 11,12 together, and as best seen in FIG. 2, a rigid ferrule 14 having a fluid seal 15 in the form of an O-ring, and a ferrule 16 having a fluid seal in the form of an O-ring 17.

The rigid housing 11 has a number of bores 18, there being eight such bores in the present embodiment. Each of the bores 18 is provided with a counterbore 19, the inner end of which defines an annular shoulder 20 against which an annular shoulder 21 on the ferrule 14 can engage.

In like manner, the rigid housing 12 is provided with a like number of bores 22, each of which has a counterbore 23, the inner end of which is an annular shoulder 24 against which an annular shoulder 25 on the ferrule 16 can engage.

The rigid ferrules 14 and 16 are identical to each other and are provided with barbs as shown, each having an enlarged portion 26,27 which defines the annular shoulders 21,25 and which are respectively disposed in the counterbores 19,23. The enlarged portion 26 of the ferrule 14 projects from a face 28 of the housing 11 and projects through a face 29 of the housing 12 and with the fluid seal 15, projects into the counterbore 23 of the housing 12 so that both the fluid seals 15,17 have a fluid-tight engagement with the counterbore 23 of the housing 12. Thus the larger end of each of the ferrules 14,16 is axially spaced from the plane of the housing faces 28,29. Thus also the inner end 30 of the ferrule 16 comprises a further annular shoulder opposite to the annular shoulder 25, the annular shoulder 30 being also disposed within the counterbore 23 to be engaged by the ferrule 14. Where the combined axial lengths of the enlarged portions 26,27 exceeds the combinaed axial length of the counterbores 19,23, the rigid housings 11,12 provide a clamping action between the coaxial ferrules 14,16.

Such clamping action is provided by the holding means 13. To this end, the rigid housing 11 has a frustoconical clamping surface 31 and the rigid housing 12 has a frustoconical clamping surface 32 directed away from the surface 31. Further, the holding means 13 includes a number of rigid clamping blocks 33, such as three, which have confronting clamping surfaces 34,35 which are complemental to the clamping surfaces 31,32 on the housings 11,12. An adjustable clamping strap 36 of known construction encircles the clamping blocks 33 and is preferably welded thereto as by a pair of spot welds each.

Figure 3:
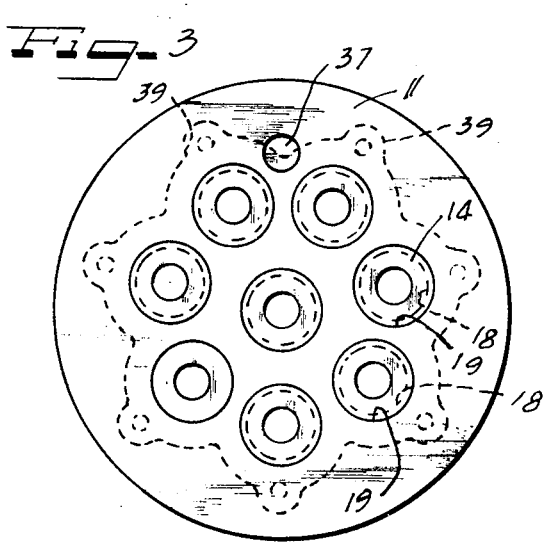
FIG. 3 is an end elevational view of one-half of the coupling assembly with the holding means removed, as viewed as indicated by the line III—III in FIG. 1.

The arrangement of the various bores 18 is preferably symmetrical so as to provide a uniform thickness of wall sections. To preclude misassembly, the rigid housing 11 is provided with a pin 37 which is integrally molded therewith (FIG. 3) and the housing 12 is provided with a corresponding recess.

In the event that the combined axial length of the enlarged portions 26,27 of the ferrules 14,16 is less than the combined axial extent of the counterbores 19,23, then the clamping action of the holding means 13 draws the housing faces 28,29 snugly together. Further, the clamping action referred to will act to seat any ferrule 14,16 that is not disposed against the corresponding annular shoulder 20,24.

The housing 11 is constructed to be secured to a cabinet wall 38, and to this end is provided with a number of coplanar mounting bosses 39, there being seven in this embodiment. The bosses 39 are tapped to receive a corresponding number of mounting screws 40 which are arranged in a generally circular manner about an opening 41 in the cabinet wall 38.

In a typical installation, a housing 12 would be fastened to each end of a numer of flexible hoses which together make up a cable of hoses. For this reason, the counterbore 23 is preferably made longer than the counterbore 19 so that the portion of the assembly that gets laid some place during servicing gets laid on the floor with the outside diameter thereof providing the support, whereby both the face 29, the counterbore 23 and the end 30 of the ferrule 16 receive a degree of protection against becoming dirtied. The projecting portion of the ferrule 14 is thus likewise rigidly held in place by the cabinet 38. To facilitate reassembly, the entrant end of the counterbore 23 is preferably provided with a lead-in surface such as the radius illustrated.

In order to utilize the fluid coupling assembly 10, a number of flexible hoses are provided, in this embodiment there being sixteen such hoses, each indicated by the numeral 42. The hose preferably comprises polyethylene tubing and typically has an outside diameter which is 0.007 inch larger than the bores 18, 22 and a free inside diameter which is 0.015 inch smaller than the outside diameter of the barbs on the ferrules 14,16. To facilitate assembly, there is therefore provided a chamfer or radius at the left end of the bore 18 and at the right end of the bore 22. The hose 42 is first inserted through the housing bore such as 18 so that it projects beyond the annular shoulder 20 by a distance corresponding to the length of the barbed portion of the ferrule 14. The ferrule 14 is then forced into the inside of the projecting end of the hose 42 so that the end of the hose 42 engages the annular shoulder 21 on the ferrule 14. Then the ferrule 14 is driven by a mallet to the position illustrated in FIG. 2 so that the annular shoulder 21 of the ferrule 14 engages the annular shoulder 20 of the housing 11. Such positioning places the end of the hose 42 substantially coplanar with the annular shoulder 21 of the housing 11.

Figure 4:
FIG. 4 is a plug used for removal and assembly of a hose to a coupling housing.

The ferrule 16 is installed in the housing 12 in a similar manner. However, when the end or annular shoulder 30 of the ferrule 16 becomes substantially coplanar with the housing face 29, a plug such as shown in FIG. 4 is inserted into the ferrule and is struck by the mallet to seat the ferrule 16 with its annular shoulder 25 in engagement with the annular shoulder 24 of the housing 12. When all of the hoses 42 have been so installed, the housing 12 is slipped onto the projecting ends of the ferrules 14, and the holding means 13 is then secured.

The fluid coupling assembly 10 can be readily assembled or disassembled by separating the housings 11, 12 after the holding means has been released by means of a screw driver which acts on a screw that forms part of the adjustable clamping strap assembly 36. Thus a screw driver is the only tool that is needed for such assembly or disassembly.

If it becomes necessary to replace one of the hoses 42, a knife is used to cut off the hose immediately adjacent to the housing 11 or 12, after which the plug shown in FIG. 4 is inserted into the ferrule 14, or 16, and the mallet is then used to drive the ferrule out in the direction from whence it came. Thus a knife, a screw driver, a mallet and the described plug comprise all the tools needed in connection with installation, removal, service, and hose replacement.

The arrangement of the various bores provides the most efficient use of a given volume of plastics material and provides a pleasing appearance as well.

As the housings 11, 12 comprise rigid vinyl, they also provide a worthwhile degree of thermal insulation for any refrigerated product that may be flowing therethrough. Further, the disclosed structure is particularly advantageous in that there is only one type and size of ferrule, only one type and size of fluid seal and only one type and size of tubing, the angular indexing or orienting being provided at no cost beyond that of the tooling for the molds.

It is to be understood that less than all of the features herein described can be utilized to advantage, but that the preferred form has been shown as required by law.

Although various minor modifications might be suggested by those versed in the art, it should be understood that I wish to embody within the scope of the patent warrented hereon, all such embodiments as reasonably and properly come within the scope of my contribution to the art.

I claim as my invention:

1. A fluid-coupling assembly, comprising:
  a. a pair of rigid housings having faces which confront and engage each other, each having at least one cylindrical rigid bore extending therethrough aligned with the bore of the other housing;
  b. at least one of said housings being adapted to snugly receive a flexible hose in at least said one of its cylindrical bores;
  c. a rigid barbed ferrule for being disposed in the end of the hose with its barbs disposed within said one bore for urging said hose against said one housing, said ferrule having a cylindrical portion directly received in and directly engaging a cylindrical portion of said one bore and projecting from said one bore through said faces and directly received in and directly engaging a cylindrical portion of said bore of said other housing; and
  d. means for detachably holding said housings together.

2. A fluid-coupling assembly according to claim 1 which includes a plurality of said ferrules respectively disposed in said one housing and for being disposed into a plurality of flexible hoses.

3. A fluid-coupling according to claim 2, each of said ferrules having a fluid seal on said cylindrical portion engaging the cylindrical portion of the aligned bore in said other housing.

4. A fluid-coupling according to claim 1 in which each of the aligned bores has a cylindrical counterbore opening into the faces of said housings and with an annular shoulder disposed in each of said counterbores, said ferrule having an enlarged cylindrical portion disposed in both of said counterbores and trapped by and between said annular shoulders.

5. A fluid-coupling according to claim 4 in which said enlarged cylindrical portion is engaged by both of said annular shoulders, said holding means being adjustable whereby said housings are clamped against said enlarged portion by said holding means.

6. A fluid-coupling assembly, comprising:
a. a pair of rigid housings having faces which confront each other, each having at least one bore aligned with the bore of the other housing, each of said bores of both of said housings having a counterbore terminating at said faces and defining an internal annular shoulder, said housings being adapted to receive a flexible hose in said bores;
b. a plurality of flexible hoses having ends respectively disposed substantially at said annular shoulders;
c. a plurality of rigid barbed ferrules identical to each other disposed in the ends of the hoses within said bores and also respectively disposed in said counterbores and having enlarged portions engaging said annular shoulders, said ferrules in one of said housings projecting from its said bore through said faces into the aligned counterbore in the other housing;
d. a fluid seal between the ferrules of both housings and the counterbores in said other housing; and
e. means for detachably holding said housings together.

* * * * *